(12) United States Patent
Harris et al.

(10) Patent No.: US 7,702,349 B2
(45) Date of Patent: Apr. 20, 2010

(54) METHOD AND APPARATUS FOR USING SEQUENTIAL GROUP CALL INITIATIONS TO AVOID WASTING RESOURCES AND BATTERY LIFE WITHIN A GROUP CALL

(75) Inventors: John M. Harris, Chicago, IL (US);
Sean S. Kelley, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 506 days.

(21) Appl. No.: 11/676,317

(22) Filed: Feb. 19, 2007

(65) Prior Publication Data
US 2008/0200158 A1 Aug. 21, 2008

(51) Int. Cl.
*H04B 7/00* (2006.01)
*H04W 4/00* (2009.01)

(52) U.S. Cl. .................. 455/519; 455/518; 455/466

(58) Field of Classification Search .......... 455/466, 455/519, 518
See application file for complete search history.

(56) References Cited

U.S. PATENT DOCUMENTS 5,513,381 A * 4/1996 Sasuta ................ 455/509
5,594,947 A * 1/1997 Grube et al. ............ 455/509
2005/0266867 A1 * 12/2005 Harris et al. ............ 455/509

* cited by examiner

*Primary Examiner*—Lun-Yi Lao
*Assistant Examiner*—Opiribo Georgewill

(57) ABSTRACT

A system [100] includes a target set of communication devices [105] for a group call. An originator communication device [102] transmits a group call initiation for the group call. A communication and processing device [125] sequentially invites the target set of communication devices in response to detecting at least one predetermined characteristic of the group call. The sequentially inviting the communication devices comprises (a) initially inviting a first subset [130] of the target set of communication devices that comprising required communication devices, (b) subsequently invites a second subset [135] of the target set of communication devices in response to determining that the group call will be initiated, and (c) joins targets of the second subset of the target set of communication devices accepting the call initiation message to a communication session involving first targets of the first subset of the target set of communication devices accepting the call initiation message.

7 Claims, 4 Drawing Sheets

METHOD AND APPARATUS FOR USING SEQUENTIAL GROUP CALL INITIATIONS TO AVOID WASTING RESOURCES AND BATTERY LIFE WITHIN A GROUP CALL

TECHNICAL FIELD

This invention relates generally to a method, apparatus, and system for the selective use of sequential group call initiations in group calls.

BACKGROUND

Group call is a widely used feature in current communication technologies, such as Push To Talk ("PTT") and Push To Experience ("PTX"), that enables an originator to establish a communication session with multiple participants. Certain group calls may require that a set of preconditions be met in order for the group call to proceed, such as a minimum quorum of overall participants, a minimum number of certain types of participants, or specific participants that are required. For example, there may be a situation where at least 90% of group members must participate in a group call for it to proceed. Alternatively, in a business setting there may be a situation requiring that at least one company lawyer, marketer, and accountant participate in the group call in order for the group call to proceed. In another example, there may be a requirement that the Chief Executive Officer ("CEO") participate in the group call in order for it to go forward. Therefore, in the event that the CEO is unable to participate in the group call, the group call cannot take place. Thus, the CEO is said to be a "required" participant in the group call.

The overall group call proceeds only if the set of preconditions are met. In current systems, all of the target devices alert the target users (e.g., by beeping, vibrating, or displaying an icon) immediately when a group call initiation or invite is received. This, however, can be very annoying for the target users because there is no guarantee at the time of the alert that the group call will be able to go forward. For example, a required participant may reject the group call initiation while others accept, and those who accept are left waiting for a call that fails to proceed, leading to a poor end user experience.

In a number of different scenarios, the targets for a group call, according to current systems, will alert users despite a high likelihood of the group call not proceeding. For example, there is a high likelihood of this happening if there is a minimum quorum of participants necessary or specific participants that are required.

Lack of assurance that a group call will proceed is especially problematic for users of cell phones or other electronic communication devices that are powered by batteries. More specifically, sending an initiation for a group call to participants using battery-powered mobile stations, for example, can result in a waste of battery power while the mobile station waits for the call to proceed even though there is no guarantee that the group call will proceed. Moreover, some of the wireless system's capacity is utilized even before it is known whether the group call will be able to proceed.

This can be annoying for users of target mobile stations that are waiting for other targets to answer, especially while waiting for manual answer targets or targets whose presence is set to "unavailable," as they can sometimes take a long time to accept a group call initiation, if at all. This is also distracting for users of target mobile stations who reacted to a beep, chirp, or even an initial talk burst audio, only to discover that the group call will not occur either because a quorum cannot be established or one or more required targets do not accept the group call initiations.

The problem is further amplified when the targets include a mixture of automatic and manual answer mode targets, or in the event that some manual answer mode targets take a longer time to answer than other manual answer mode targets. System operators are typically sensitive to capacity and/or targets are sensitive to battery life or having their user's time wasted waiting for a group call that is either delayed or does not occur.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
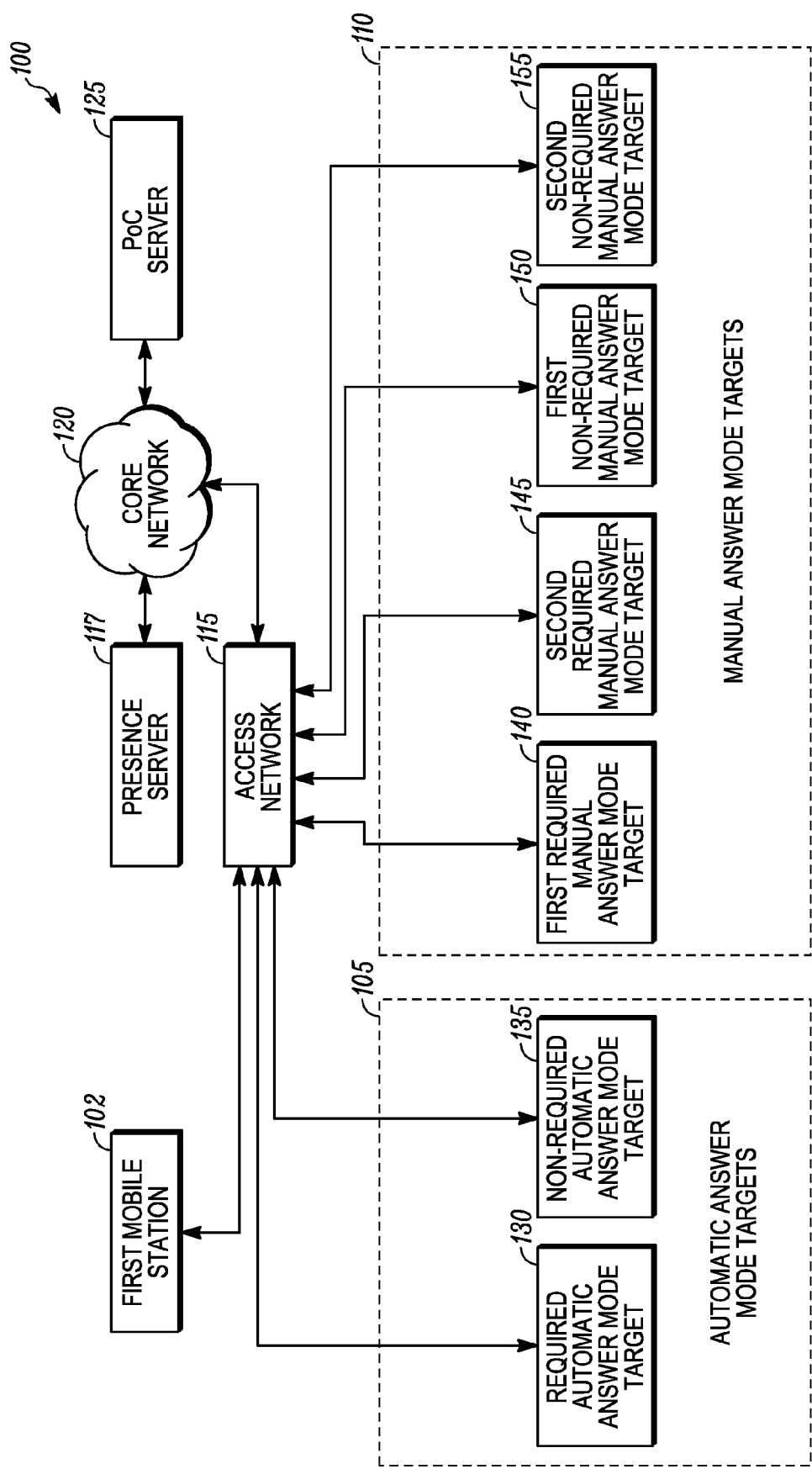
FIG. 1 illustrates a system according to at least one embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

Certain group calls often require that a set of preconditions be met in order for the group call to proceed. For example, a minimum quorum of overall participants, a minimum number of certain types of participants, or specific participants may be required for a group call to proceed. In group calls, one party initiates the sending of group call initiations or invites to the members of the group, i.e., the targets. The group call can proceed once the set of preconditions have been met.

In order for the group call to proceed, the quorum of targets must first be obtained. The quorum may include "required" targets and "non-required" targets. A required target is a target that must participate in the group call. For example, if the group call is for members presenting marketing ideas to the CEO of a company, the CEO may be a required target such that the group call cannot be approved unless the CEO has accepted an initiation for the group call. The quorum may also comprise a predetermined minimum threshold percentage or number of non-required targets accepting. A non-required target is a specific target that does not have to accept the group call initiation for the group call to proceed. In the event that the group call is for an accounting department of a company, there may be a requirement that 80% of the targets must accept group call initiations before the group call can proceed.

To avoid unnecessarily using the system resources and battery resources of certain mobile stations that are targets of the group call, a server or processor determines characteristics for the various targets of the group call upon receiving a group call initiation from a mobile station or other electronic communication device. The group call may by a Push To Talk ("PTT") or Push To Experience ("PTX") group call, an Instant Message ("IM"), a video call, a gaming call, call forwarding, or a Plain Old Telephone System ("POTS") call. First, upon receiving the group call initiation, the server determines the identities of the targets of the call. The targets may be directly indicated within the group call initiation. Alternatively, the targets may be indirectly listed. For example, the list of targets may be pre-stored within a memory of the server. Upon receiving the name of the list in the group call initiation, the server will refer to the memory to determine the identities of the targets.

Next, the server determines which of the targets are required, and which are non-required. The server also determines which of the targets are set to a manual answer mode, and which are set to an automatic answer mode. There are various modes in which a phone may be configured. In the manual answer mode, a user has to manually press a button or perform some other type of action to accept a group call initiation, much like the way one would answer a typical telephony call. In the automatic answer mode, on the other hand, the phone is configured to automatically accept the group call initiation.

If none of the targets are required, the server may send out group call initiations, also known as invites, for the group call to all of the targets at substantially the same time, i.e., without prioritizing the order in which the initiations for the group call are sent. In the event, however, that at least some of the targets are required and are in the manual answer mode, group call initiations are sent according to a selected priority to maximize the efficiency of sending the group call initiations. In the event that at least some of the targets are required and in the manual answer mode, the group call cannot proceed until or unless all required targets accept their respective group call initiations. System capacity and battery life of mobile stations receiving a group call initiation are utilized while the system waits to determine whether a quorum of the targets and/or all required targets accept their respective group call initiations and the group call can proceed. The group call initiations are prioritized to minimize the adverse effect on system capacity, battery life, and user experience.

For example, if there is a large number (greater than a certain threshold) of required manual answer targets that are marked as unavailable within a presence server for the system, a wide mixture of manual answer versus automatic answer mode targets, target mobile stations that have a poor signal strength or Radio Frequency ("RF") conditions, or if the wireless system is loaded, there is a greater than normal probability that the quorum will not be achieved and the group call will not go through. Other criteria may be considered, such as whether certain targets are available before the first opportunity to contact certain other targets, or whether some of the targets are known to have a low battery life or are currently experiencing low battery power conditions. Information regarding the various factors listed above may be determined by the target mobile stations, and other resources available within the Core Network, an Application Server (e.g. Presence Server), and a Radio Access Network ("RAN").

In the event that any of the criteria listed above are detected, the server sends the initiations to the targets sequentially, i.e., one or more initiations is sent initially, and then after a delay, additional initiations are sent. First, the required targets are sent the group call initiations. Based on the presence information for each of the targets, decisions are made regarding when each particular target is to receive a group call initiation. For example, certain targets may be sent group call initiations earlier than others if they have their presence state set to unavailable or utilize a manual answer mode setting, because they are less likely to accept. The manual answer mode targets that are known to have longer expected response times may be sent group call initiations earlier than others. Targets having a relatively high battery life or that are plugged in may also be sent group call initiations sooner. Similarly, lower-cost RF users may be sent group call initiations earlier. Lower-cost RF users may comprise those targets having a better signal strength, less loaded sectors, co-located targets (e.g., where multicast may be used), nearby or non-long-distance targets. Distance may be an especially important factor when there is a wide range of distance values among the targets.

Targets utilizing slower RF technologies or which wake up soon but will not wake up again for a long time may also be sent group call initiations earlier than other targets. Finally, certain other targets are sent group call initiations initially if it is known that other targets will only accept after the selected targets accept. This information regarding specific targets may be determined, for example, by maintaining call history information for targets, subscribing to presence information about targets (e.g., availability, location, or battery level), and/or pre-configured attributes stored within a memory of the server. If any of the required targets reject the group call during this sequential group call initiation process, the server stops sending out the group call initiations and tears down the group call.

After the initial group call initiations have been sent out and it has been established that the group call will proceed, group call initiations are sent to the remaining targets who have not yet been sent the group call initiations. The order in which the remaining targets are sent group call initiations may be further prioritized such that the remaining manual answer targets receive the group initiations first, and then the automatic answer mode targets receive their group initiations.

This sequential group call initiation process is implementable within the server. The teachings discussed herein also apply to normal telephony and normal telephony is performed over an instant communication group call similar to a PTT group call except that it is full-duplex and low latency.

FIG. 1 illustrates a system 100 according to at least one embodiment of the invention. As shown, the system 100 includes a first mobile station 102, a set of automatic answer mode targets 105, a set of manual answer mode targets 110, an access network 115, a Presence server 117 and/or another application server, a core network 120, and a PTT Over Cellular ("PoC") server 125. The set of automatic answer mode targets 105 includes a required automatic answer mode target 130 and a non-required automatic answer mode target 135. The set of manual answer mode targets 110 includes a first required manual answer mode target 140, a second required manual answer mode target 145, a first non-required manual answer mode target 150, and a second non-required manual answer mode target 155. The various targets shown within the set of automatic answer mode targets 105 and the manual answer mode targets 110 are examples, and a person of ordinary skill in the art would readily appreciate that more or fewer targets may be included. A person of ordinary skill in the art would also appreciate that various targets may be scattered throughout the coverage area and that the set of automatic answer mode targets may overlap with the set of manual answer mode targets regarding their respective locations within the coverage area.

In the event that a user of the first mobile station 102 desires to initiate a group call, the user may depress a certain button on the first mobile station 102, dial a predetermined phone number, or send the group call initiation request in some way. The first mobile station 102 may have a list of the targets for the group pre-stored in its memory and include the list in the group call initiation request. Alternatively, the specific number being dialed may be associated with certain targets by the PoC server 125 beforehand. The first mobile station 102 may be a cellular phone, personal computer, or other communication device. The first mobile station 102 transmits the group call initiation request through the access network 115 and core network 120 to the PoC Server 125. The PoC server 125 controls the group call session. The PoC server 125 may be in communication with additional PoC servers (not shown). The PoC server 125 may send initiations through the core network 120 and the access network 115 to be sent to any targets in communication with the access network 115. The PoC server 125 keeps track of which targets have accepted initiations.

FIG. 1 shows all targets connected to one access network. It should be appreciated, however, that there could be multiple access networks, such as Code Division Multiple Access 2000 ("CDMA2000"), Global System for Mobile Communications ("GSM"), and cable. In such embodiments, the targets can be connected to these various access networks while still following the teachings described herein.

The PoC server 125 determines whether the "quorum" has been reached (e.g., all required targets, and/or a minimum number of targets). The PoC server 125 knows what the preconditions are for the group call to proceed, based on information received in the group call initiation request and/or preconfigured attributes of the group. The PoC server 125 may also know the answer mode setting of the targets.

Figure 2:
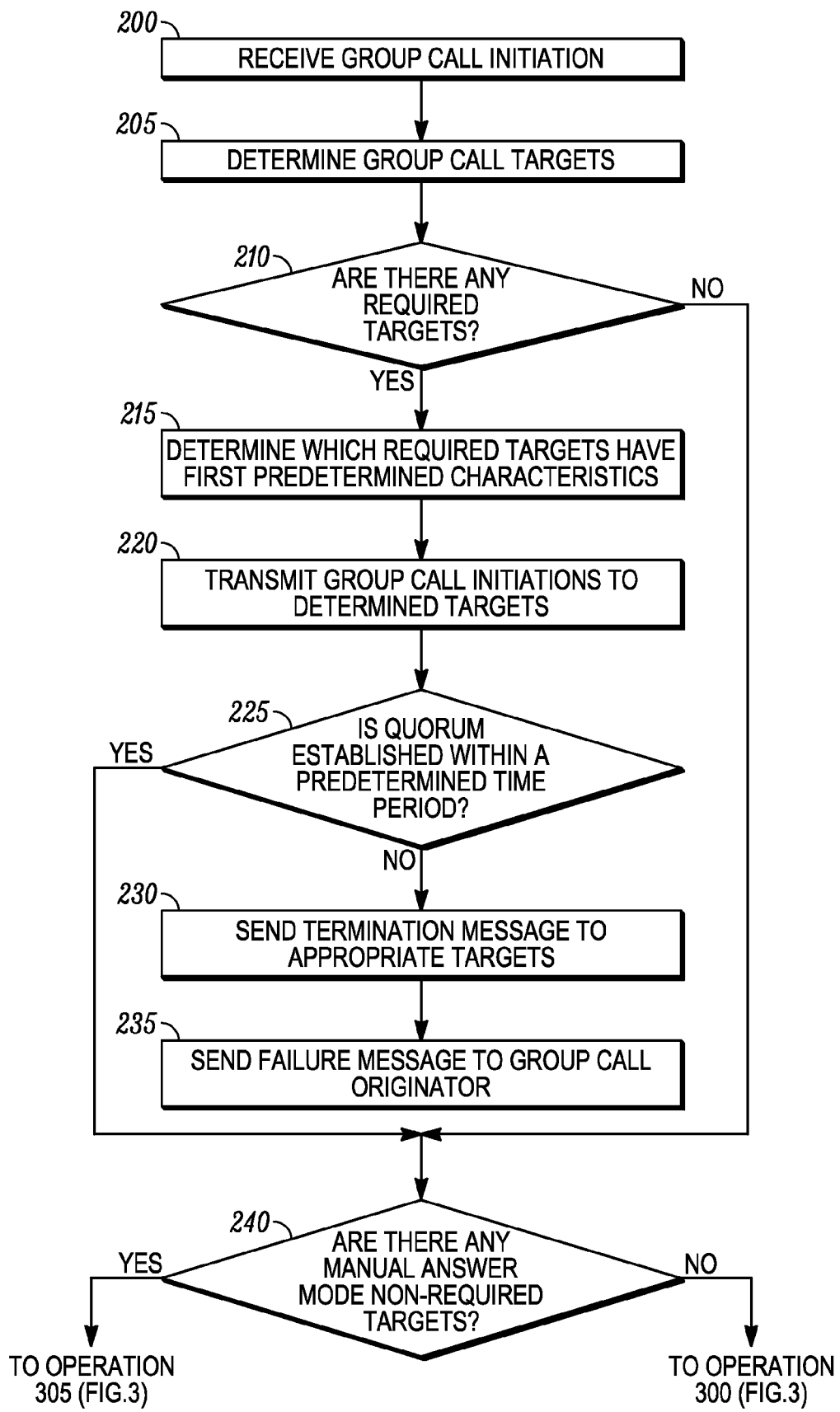
FIGS. 2 and 3 illustrate a method of transmitting sequential group call initiations according to at least one embodiment of the invention.
Figure 3:
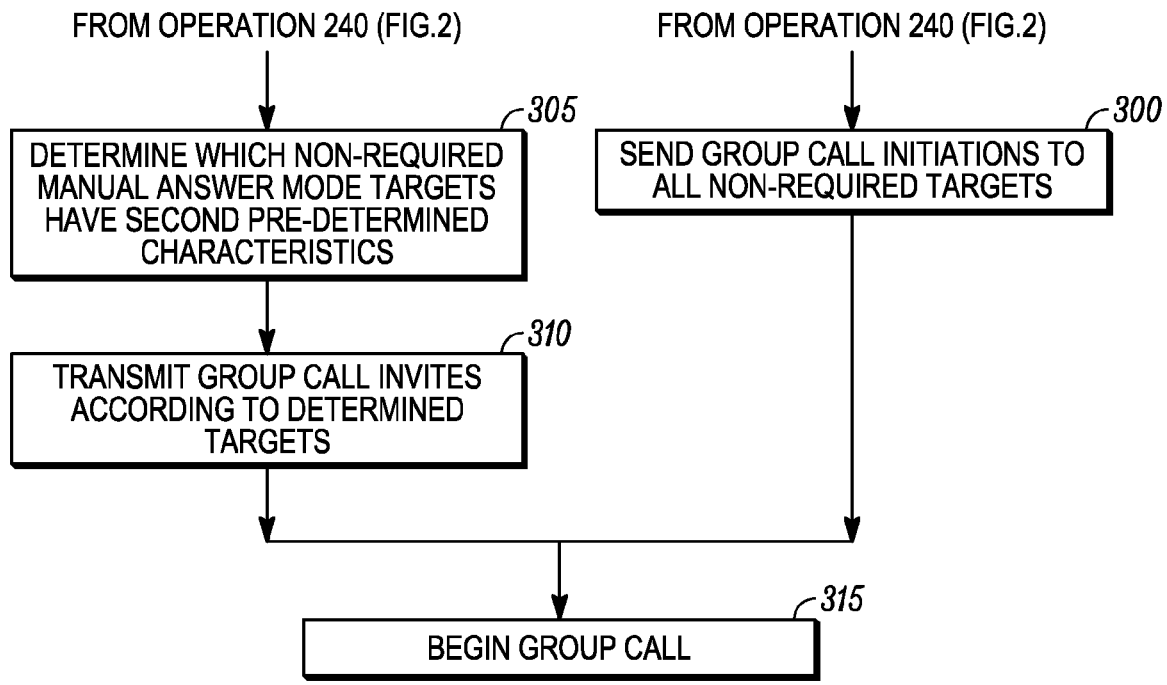

FIGS. 2 and 3 illustrate a method of transmitting sequential group initiations according to at least one embodiment of the present invention. First, at operation 200, a group call initiation is received by the PoC server 125. The group call initiation is generated by the first mobile station 102 and transmitted through the access network 115 and the core network 120 to the PoC server 125. Upon receiving the group call initiation request from the first mobile station 102 the PoC server 125 makes several determinations about the targets of the group call.

At operation 205, the PoC server 125 determines the group call targets. The targets may be directly indicated within the group call initiation. Alternatively, the targets may be indirectly listed. For example, the list of targets may be pre-stored within a memory of the server. Upon receiving the name of the list in the group call initiation, the PoC server 125 will refer to the memory to determine the identities of the targets.

Next, at operation 210, the PoC server 125 determines whether any of the targets are required for the group call to proceed. If there are required targets, processing proceeds to operation 215. If, on the other hand, there are no required targets, processing proceeds to operation 240. At operation 215, the PoC server 125 prioritizes the required targets according to first predetermined characteristic criteria. A quorum of the required targets must be achieved before the group call can proceed. The quorum may comprise a minimum number of certain types of targets, or specific targets that are required.

The reason why the required targets are sent out in a particular order is because there is a possibility that the quorum may not be achieved. The first predetermined characteristics comprise several criteria that, if present, may reduce the likelihood that the quorum will be achieved. For example, the first predetermined characteristics may include determination of whether there is a large number (greater than a certain threshold) of required manual answer targets that are marked as unavailable within the presence server, a wide mixture of manual answer versus automatic answer mode targets, or target mobile stations that have a poor signal strength or Radio Frequency ("RF") conditions. Another characteristic considered is whether the wireless system is loaded or targets have poor signal strength or RF conditions. This information may be determined by the target mobile stations, and other resources available within the Core Network 120, an Application Server (e.g., the Presence Server 117), and the access network 115. An additional factor is whether it is possible to determine whether certain targets are available before the first opportunity to contact certain other targets. Finally, a determination of whether some of the targets have a low battery life or are currently experiencing low battery power conditions may also be considered.

In the event that any, or a threshold number, of the first predetermined characteristics are detected, the PoC server 125 sends group call initiations to the targets sequentially, i.e., non-simultaneously. First, the required targets are sent group call initiations. Based on the presence information for each of the targets, additional factors may be considered in determining which targets to initially send group call initiations. For example, certain targets may be sent group call initiations earlier than others if they have their presence state set to unavailable or utilize a manual answer mode setting. The manual answer mode targets are more problematic for targets having longer expected response times. Targets having a relatively high battery life or that are plugged in may also be sent group call initiations sooner. Similarly, lower-cost RF users may be sent group call initiations earlier. Lower-cost RF users may comprise those targets having a better signal strength, less loaded sectors, co-located targets, or nearby or non-long-distance targets. This factor may be especially important when there a wide range of values among the targets.

Targets utilizing slower RF technologies or which wake up soon but will not wake up again for a long time may also be initially sent group call initiations. Finally, certain other targets are sent group call initiations initially if it is known that other targets will only accept after the selected target accepts. This information regarding specific targets may be determined, for example, by maintaining call history information for targets, subscribing to presence information about targets (e.g., availability, location, battery level, etc), and/or preconfigured attributes stored within a memory of the server.

Next, at operation 220, group call initiations are transmitted to targets determined at operation 215. At operation 225, the PoC server 125 determines whether a quorum has been established within a predetermined time period. The PoC server 125 may include a timer for measuring this time interval. If "yes," processing proceeds to operation 240. If "no," on the other hand, processing proceeds to operation 230 where a termination message is sent to the appropriate targets, such as those required targets that have already received and accepted the group call initiations. Next, at operation 235, a failure message is sent to the group call originator.

At operation 240, the PoC server 125 determines whether there are any manual answer mode non-required targets. If "yes," processing proceeds to operation 305 shown in FIG. 3. If "no," on the other hand, processing proceeds to operation 300 shown in FIG. 3. At operation 300, group call initiations are transmitted to all non-required targets, and then processing proceeds to operation 315.

At operation 305, the non-required manual answer mode targets are prioritized according to a second set of predetermined characteristics or criteria. For example, group call initiations may be transmitted first to remaining non-required manual answer mode targets known to take a relatively long time to accept group call initiations. Next, at operation 310, group call initiations are sent according to the targets determined at operation 305 and then to the remaining targets. Finally, processing proceeds to operation 315 at which point the group call begins. At this point, targets of the second subset of the target set of communication devices accepting the call initiation message are joined to a communication session involving first targets of the first subset of the target set of communication devices accepting the call initiation message.

Figure 4:
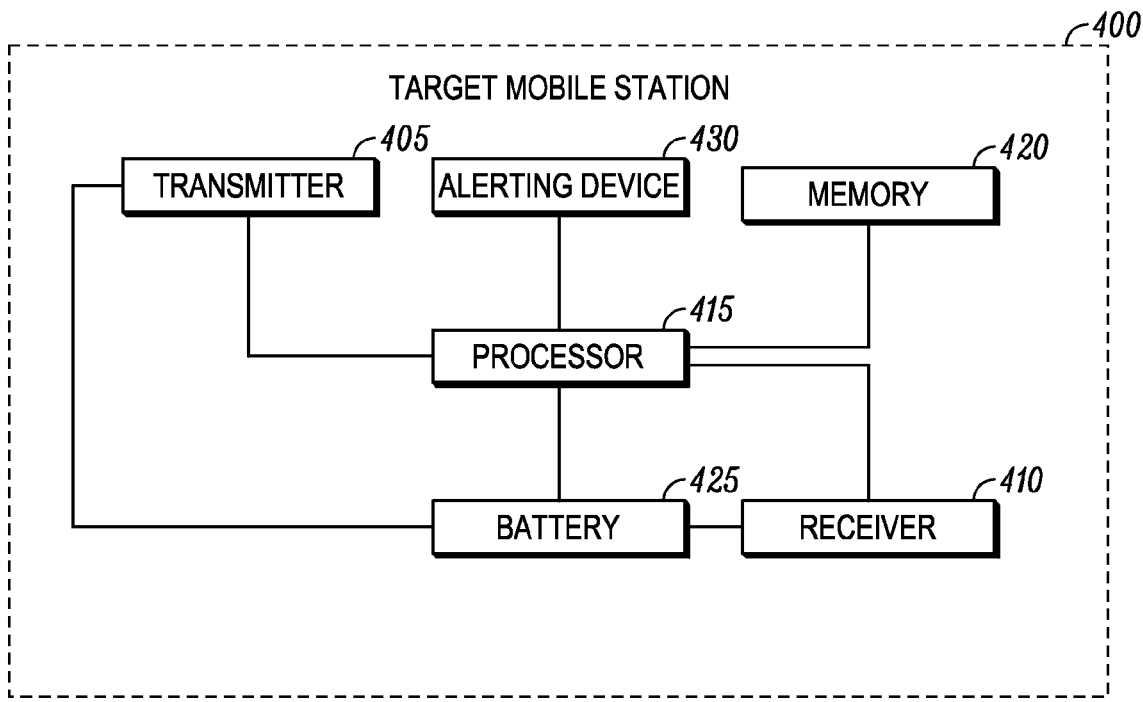
FIG. 4 illustrates a target mobile station according to at least one embodiment of the invention.

FIG. 4 illustrates a target mobile station 400 according to at least one embodiment of the invention. As shown, the target mobile station 400 includes a transmitter 405, a receiver 410, a processor 415, a memory 420, a battery 425, and an alerting device 430. The receiver 410 receives communications from an access network and the transmitter 405 transmits communications to the access network, such as the access network 115 shown in FIG. 1. In the event that a group call initiation is received, the processor 415 controls the alerting device to alert the user by, for example, beeping, chirping, or vibrating so that the user knows that the group call initiation has been received. Also, in the event that the target mobile station 400 is in the manual answer mode, the user is alerted so that the user can manually accept the group call initiation by, for example, pressing a button on the target mobile station 400 or entering a code.

Figure 5:
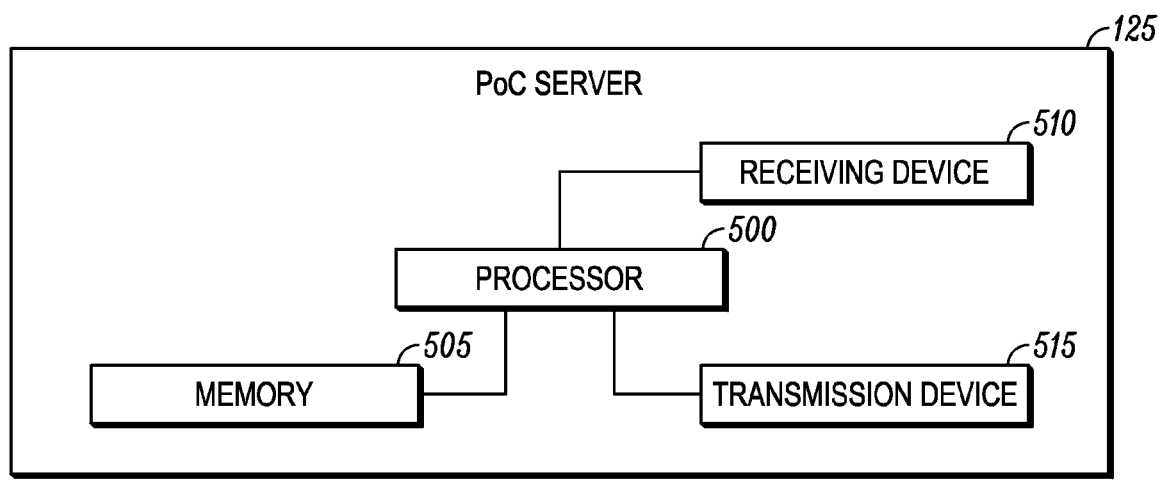
FIG. 5 illustrates a PoC server according to at least one embodiment of the invention.

FIG. 5 illustrates a PoC server 125 according to at least one embodiment of the invention. As shown, the PoC server 125 includes a processor 500, a memory 505, a receiving device 510, and a transmission device 515. The memory 505 may store an instruction code to be executed by the processor 500. The memory 505 may also store a list of the identities of targets of a group, as well as information relating to an operating mode of each of the targets, such as whether they use the manual answer mode or automatic answer mode, and information relating to whether each target is required or non-required. The receiving device 510 receives the group call initiation. The transmission device 515 sends group call initiations to group members. The initiations are sent to the group targets through the relevant access networks.

Figure 6:
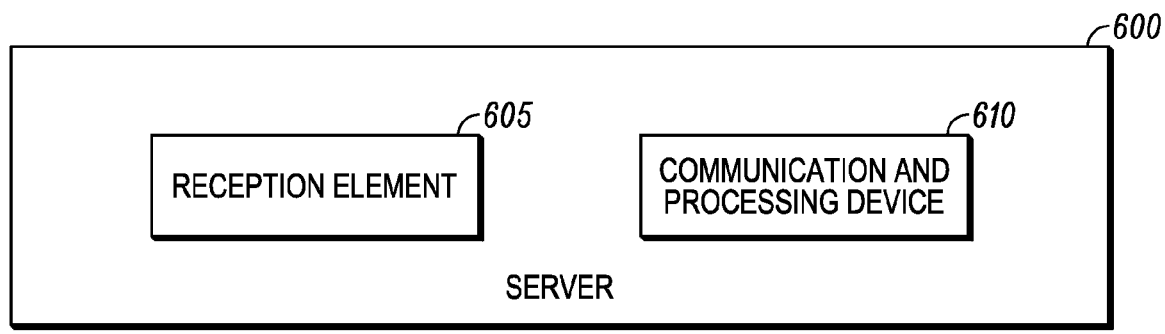
FIG. 6 illustrates a server for implementing the method of transmitting sequential group call initiations according to at least one embodiment of the invention.

FIG. 6 illustrates a server 600 for implementing the processing discussed above with respect to FIGS. 2 and 3 according to at least one embodiment of the invention. The server includes a reception element 605 for receiving a group call initiation request for a group comprising a target set of communication devices. A communication and processing device 610 sequentially invites the target set of communication devices in response to detecting at least one predetermined characteristic of the group call. The sequentially inviting the target set of communication devices includes (a) transmitting a call initiation message to a first subset of the target set of communication devices; (b) subsequently transmitting the call initiation message to a second subset of the target set of communication devices in response to determining that a precondition has been met; and (c) joining targets of the second subset of the target set of communication devices accepting the call initiation message to a communication session involving first targets of the first subset of the target set of communication devices accepting the call initiation message.

The at least one predetermined characteristic may include a combination of a first detection of first criteria and a second detection of second criteria. The first detection is based on the following criteria: (a) more than a first threshold number of targets having a battery life below a first predetermined battery life threshold; (b) more than a second threshold number of targets utilizing an automatic answer mode and having the battery life below a second predetermined battery life threshold; more than a third threshold number of required targets; (c) more than a fourth threshold number of required targets having at least one of a predetermined presence state and a manual answer mode setting; (d) more than a fifth threshold number of targets having a manual answer mode setting. The second detection is based on a presence of at least one first target of the first subset and at least one second target of the second subset during the first detection.

It should be appreciated that variations of the embodiments described above may also be utilized. For example, there may be only non-required targets that are both manual answer mode and automatic answer mode in some embodiments. But an automatic answer mode target that has high battery life may be invited before a manual answer mode target that has low battery life. Ultimately, the decision is based on the quorum (the focus of FIGS. 2 and 3) but also on efficient resource utilization AND user experience.

These teachings described herein apply to Plain Old Telephone systems ("POTs"), PTT, PTX, and text messaging both with and without video. These teachings are directed to a system and method for sequentially sending group call initiations in a way that minimizes use of system and target bandwidth and resources in the event that the group call is unable to proceed, and/or improving user experience by minimizing the delay between a target user being alerted upon receiving a group call initiation and the group call actually proceeding (e.g., audio being heard).

Current systems annoy targets when group call initiations are sent to all targets at the same time and the respective targets chirp, beep, vibrate, or make some other indication that a group call initiation has been received. For example, the target users sometimes react to the indication that the group call initiation has been received and wait for a group call, only to eventually discover that the group call cannot proceed or proceeds after a lengthy delay. The teachings disclosed herein, on the other hand, provide a method and system for avoiding excessive use of system capacity and battery life of targets when it is unclear as to whether the group call will be able to proceed. As previously mentioned, a group call may not proceed due to a lack of a quorum or one or more required targets have not accepted a group call initiation. Similarly, the group call may proceed after a lengthy delay while waiting for targets that are slow to accept the group call initiation request.

Upon receiving a group call initiation for a group call to a target set of communication devices, a PoC server determines the identities of the targets as well as various characteristics about the targets, based on call history information about the targets, presence information about targets, and/or stored attributes about the group. For example, the PoC server may consider criteria such as the overall number of targets, whether each particular target is in automatic answer mode or manual answer mode, the RF conditions or congestions each of the targets is experiencing or likely to experience, a present location of each of the targets, a determination of whether each particular target is required or non-required for the group call to proceed, the remaining battery life of each of the targets, a determination of an anticipated response time the target, a determination that the target is a lower RF cost user, a determination that the target uses a slower RF technology, a determination that the target is to wake up soon but will not wake up against for a long time, or a determination that other targets which will join but only in response to the target accepting the call initiation message.

Based upon the factors listed above, or combinations of the factors listed above, group call initiations are sent sequentially. The order in which the group call initiations are sent is selected so that, for example, group call initiations are sent to the targets most likely to not accept (and cause the quorum to not be reached) and/or take the longest to accept, and/or the less expensive targets. These teachings result in capacity savings as well as battery savings of targets in the group, thereby causing the wireless system to operate more efficiently, and improve the user experience of group members.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method, comprising:
    receiving a group call initiation request for a group comprising a target set of communication devices; and
    in response to detecting at least one predetermined characteristic of the group call, sequentially inviting the target set of communication devices, the sequentially inviting comprising:
        transmitting a call initiation message to a first subset of the target set of communication devices;
        subsequently transmitting the call initiation message to a second subset of the target set of communication devices in response to determining that a precondition has been met; and
        joining targets of the second subset of the target set of communication devices accepting the call initiation message to a communication session involving first targets of the first subset of the target set of communication devices accepting the call initiation message;
        wherein the at least one predetermined characteristic comprises a combination of: a first detection of at least one of: more than a first threshold number of targets having a battery life below a first predetermined battery life threshold; more than a second threshold number of targets utilizing an automatic answer mode and having the battery life below a second predetermined battery life threshold; more than a third threshold number of required targets; more than a fourth threshold number of required targets having at least one of a predetermined presence state and a manual answer mode setting; and more than a fifth threshold number of targets having a manual answer mode setting; and a second detection of a presence of at least one first target of the first subset and at least one second target of the second subset during the first detection; wherein the at least one of a predetermined presence state is at least one of unavailable and indicative that a target is in a physical location having at least a predetermined probability of not accepting the call initiation message; wherein the physical location is at least one of: a first location having low wireless coverage, and a second location having predetermined call restrictions.

2. The method of claim 1, further comprising categorizing a target as being within the first subset of the target set of communication devices based on at least one of:
    a presence state for the target being set to unavailable;
    a determination that the target is in a location where targets typically do not accept call initiation messages;
    a determination that greater than a threshold amount of time has elapsed since the target has performed at least one of: communicating with a network and registering with the network;
    use of manual answer mode by the target;
    a determination of an anticipated time required for the target to accept the call initiation message exceeds a threshold;
    a determination that the target has a battery life greater than a battery life threshold level;
    a determination that the target is a lower RF cost user;
    a determination that the target is likely to be in a location unlikely to have sufficient coverage for receiving the call initiation message;
    a determination that the target uses a slower RF technology;
    a determination that the target is to wake up soon but will not wake up again for at least a threshold amount of time; and
    a determination that other targets which will join only in response to the target accepting the call initiation message.

3. The method of claim 1, wherein the determining that the precondition has been met is based on at least one of: all required targets of the first subset of target set of communication devices accepting the call, at least a threshold number of the first subset of target set of communication devices accepting the call, at least a threshold number of the first subset of target set of communication devices responding to the call with an acceptance or a rejection, and a timer expiring.

4. The method of claim 1, further comprising transmitting a call failure notification to the first subset of the target set of communication devices, after the transmitting of the call initiation message, in response to determining that the precondition has not been met.

5. A server, comprising:
    a reception element for receiving a group call initiation request for a group comprising a target set of communication devices; and
    a communication and processing device for sequentially inviting the target set of communication devices in response to detecting at least one predetermined characteristic of the group call, the sequentially inviting the target set of communication devices comprising:
        transmitting a call initiation message to a first subset of the target set of communication devices;
        subsequently transmitting the call initiation message to a second subset of the target set of communication devices in response to determining that a precondition has been met; and
        joining targets of the second subset of the target set of communication devices accepting the call initiation message to a communication session involving first targets of the first subset of the target set of communication devices accepting the call initiation message;
        wherein the communication and processing device is adapted to detect the at least one predetermined characteristic comprising a combination of: a first detection of at least one of: more than a first threshold number of targets having a battery life below a first predetermined battery life threshold; more than a second threshold number of targets utilizing an automatic answer mode and having the battery life below a second predetermined battery life threshold; more than a third threshold number of required targets; more than a fourth threshold number of required targets having at least one of a predetermined presence state and a manual answer mode setting; and more than a fifth threshold number of targets having a manual answer mode setting; and a second detection of a presence of at least one first target of the first subset and at least one second target of the second subset during the first detection; wherein the at least one of a predetermined presence state is at least one of unavailable and indicative that a target is in a physical location having at least a predetermined probability of not accepting the call initiation message; wherein the physical location is at least one of: a first location having low wireless coverage, and a second location having predetermined call restrictions.

6. The server of claim 5, wherein the communication and processing device is adapted to determine that the precondition has been met is based on at least one of: all required targets of the first subset of target set of communication devices accepting the call, at least a threshold number of the first subset of target set of communication devices accepting the call, at least a threshold number of the first subset of target set of communication devices responding to the call with an acceptance or a rejection, and a timer expiring.

7. The server of claim 5, wherein the communication and processing device is adapted to transmit a call failure notification to the first subset of the target set of communication devices, after transmitting the call initiation message, in response to determining that the precondition has not been met.

* * * * *